(12) United States Patent
Srivastava

(10) Patent No.: US 12,496,087 B2
(45) Date of Patent: Dec. 16, 2025

(54) ULTRASONIC SURGICAL DEVICE

(71) Applicant: Sudhir Prem Srivastava, Gurugram (IN)

(72) Inventor: Sudhir Prem Srivastava, Gurugram (IN)

(*) Notice: Subject to any disclaimer, the term of this patent is extended or adjusted under 35 U.S.C. 154(b) by 180 days.

(21) Appl. No.: 18/690,556

(22) PCT Filed: Oct. 9, 2023

(86) PCT No.: PCT/IN2023/050912
§ 371 (c)(1),
(2) Date: Mar. 8, 2024

(87) PCT Pub. No.: WO2024/079744
PCT Pub. Date: Apr. 18, 2024

(65) Prior Publication Data
US 2025/0134546 A1    May 1, 2025

(30) Foreign Application Priority Data
Oct. 10, 2022   (IN) .............................. 202211056151

(51) Int. Cl.
*A61B 17/32* (2006.01)
*A61B 17/00* (2006.01)

(52) U.S. Cl.
CPC ................ *A61B 17/320092* (2013.01); *A61B 2017/00084* (2013.01); *A61B 2017/0011* (2013.01);
(Continued)

(58) Field of Classification Search
CPC ........... A61B 17/320092; A61B 2017/320094; A61B 2017/320071; A61B 2017/320078;
(Continued)

(56) References Cited

U.S. PATENT DOCUMENTS 10,842,523 B2    11/2020    Shelton, IV
2011/0098689 A1   4/2011    Nau, Jr.
(Continued)

FOREIGN PATENT DOCUMENTS

| EP | 3505076 B1 | 6/2022 |
| WO | 2007021958 A1 | 2/2007 |
| WO | 2022084839 A1 | 4/2022 |

*Primary Examiner* — Ashley L Fishback
(74) *Attorney, Agent, or Firm* — Maschoff Brennan

(57) ABSTRACT

An ultrasonic surgical device comprising of a proximal end and a distal end to be used in a robotic surgical system. The distal end comprises of a first jaw with an ultrasound transducer array and a second jaw with either a reflecting surface or an ultrasound transducer array. The distal end is configured to grasp a blood vessel or a living tissue. The proximal end is configured to apply a drive signal to the ultrasound transducer array. A plurality of rotary joints is connected at the distal end to facilitate its articulation. The ultrasound transducer array, generates acoustic vibrations in the grasped blood vessel, or living tissue, based on the applied drive signal by a control system of the robotic surgical system. The ultrasound transducer array, is configured to sense parameters of a target site on a grasped blood vessel or living tissue, based on the reflected acoustic vibrations.

26 Claims, 20 Drawing Sheets

(52) U.S. Cl.
CPC ............... *A61B 2017/00836* (2013.01); *A61B 2017/00862* (2013.01); *A61B 2017/320071* (2017.08); *A61B 2017/320078* (2017.08); *A61B 2017/320094* (2017.08)

(58) Field of Classification Search
CPC .. A61B 2017/00084; A61B 2017/0011; A61B 2017/00836; A61B 2017/00862
See application file for complete search history.

(56) References Cited

U.S. PATENT DOCUMENTS

| | | | |
|---|---|---|---|
| 2016/0030077 A1* | 2/2016 | Durvasula | A61B 17/320092 |
| | | | 600/249 |
| 2020/0246041 A1* | 8/2020 | Morimoto | A61B 8/445 |
| 2021/0169516 A1 | 6/2021 | Houser | |

* cited by examiner

ULTRASONIC SURGICAL DEVICE

TECHNICAL FIELD

The present disclosure generally relates to a medical device, and more particularly, the invention relates to an ultrasonic surgical device for sealing vessels or transecting tissue in a minimally invasive surgical procedure to be used in conjunction with a surgical robot.

BACKGROUND

This section is intended to introduce the reader to various aspects of art that may be related to various aspects of the present disclosure, which are described below. This disclosure is believed to be helpful in providing the reader with background information to facilitate a better understanding of the various aspects of the present disclosure. Accordingly, it should be understood that these statements are to be read in this light, and not just as an admissions of prior art.

Robotic assisted surgical systems have been adopted worldwide to gradually replace conventional surgical procedures such as open surgery and laparoscopic surgical procedures. The robotic assisted surgery offers various benefits to a patient during surgery and during post-surgery recovery time. The robotic assisted surgery equally offers numerous benefits to a surgeon in terms of enhancing the surgeon's ability to precisely perform surgery, less fatigue and a magnified clear three-dimensional (3D) vision of a surgical site. Further, in a robotic assisted surgery, the surgeon typically operates with a hand controller/master controller/surgeon input device/joystick at a surgeon console system to seamlessly receive and transfer complex actions performed by him/her giving the perception that he/she himself/herself is directly articulating a surgical tools/surgical instrument to perform the surgery. The surgeon operating on the surgeon console system may be located at a distance from a surgical site or may be located within an operating theatre where the patient is being operated on.

The robotic assisted surgical systems may comprise of multiple robotic arms aiding in conducting robotic assisted surgeries. The robotic assisted surgical system utilizes a sterile adapter/a sterile barrier to separate a non-sterile section of the multiple robotic arms from a mandatory sterile surgical tools/surgical instrument attached to one end of the multiple robotic arms. The sterile adaptor/sterile barrier may include a sterile plastic drape that envelops the multiple robotic arms and the sterile adaptor/sterile barrier that operably engages with the sterile surgical tools/surgical instrument in the sterile field.

During robotic assisted surgery, a surgeon has to seal a vessel or transect a tissue. Ultrasonic surgical instruments have provided excellent vessel scaling, efficient transection, minimal lateral thermal damage, low smoke generation and no risk of electrical current passage through the patient. The ultrasonic surgical instruments have a distal end and a proximal end. The distal end of the ultrasonic surgical instruments may include a jaw and a blade/bar and during the sealing or transection of the tissue/vessel, the blade/bar is vibrated by energy from an ultrasonic transducer. The ultrasonic energy is transmitted to the tissue/vessel from the blade/bar by pressing the blade/bar against the tissue/vessel either directly or by means of an opposing jaw. The ultrasonic transducer is located in the proximal portion of the device where there is sufficient room to mount the relatively large transducer. The ultrasonic energy can only be transmitted along the ultrasonic displacement axis of the transducer. Typically, the ultrasonic energy from the transducer is transmitted using a rod extending out the displacement axis of the ultrasonic transducer. This rod is connected to the blade/bar at the distal end of the device.

One of the main challenges in these ultrasonic surgical instruments is that a rod is used to transfer vibrations from the proximal end to the distal end and hence, the vibrations generated by the rod will get dampened. This will cause loss of clarity in signal frequency and amplitude. Thus, very high energy vibrations away from the resonance modes of the rod will have to be generated to effectively transfer the ultrasonic from proximal to distal end to be converted into heat to the vessel or a tissue for cutting/coagulation.

Another challenge is that owing to a linear arrangement of the existing ultrasonic transducer, transmission rod, and end-effector blade/bar, ultrasonic technology has been limited to straight or co-axial designs.

Further, another challenge is that articulation is not present at the distal end of the existing ultrasonic surgical devices. Thus, articulation of the end effector needs to be performed via base joint, leading to inaccessible spaces inside the patient body and robot arms need to be moved more to access the same/equivalent space. This lack of articulation is not desirable as the surgeon can feel limited access inside the patient's body.

Further, as the energy localization/concentration is along the complete instrument body till the distal end of the existing ultrasonic surgical devices, this leads to a higher risk of discharge of ultrasonic energy at unwanted points.

In light of the aforementioned challenges, there is a need for providing an ultrasonic surgical device which will solve the above-mentioned problems related to robotic assisted surgeries.

SUMMARY OF THE DISCLOSURE

Some or all of the above-mentioned problems related to providing an articulated ultrasonic surgical device are proposed to be addressed by certain embodiments of the present disclosure.

According to an aspect of the invention, there is disclosed an ultrasonic surgical device for a robotic surgical system, the device comprising: a distal end having a first jaw and a second jaw, the first jaw comprises of an ultrasound transducer array, the second jaw comprises of either a reflecting surface or an ultrasound transducer array, the distal end is configured to grasp a blood vessel or a living tissue; a proximal end configured to apply a drive signal to the ultrasound transducer array of the distal end; and a plurality of rotary joints connected at the distal end, the plurality rotary joints configured to facilitate articulation of the distal end; wherein the ultrasound transducer array of the distal end is configured to generate acoustic vibrations in the grasped blood vessel, or living tissue, based on the applied drive signal by a control system of the robotic surgical system; wherein the ultrasound transducer array of the distal end is configured to sense parameters of a target site on a grasped blood vessel or living tissue, based on the reflected acoustic vibrations from the grasped blood vessel or living tissue; wherein based on the sensed parameters of the target site, the drive signal to the ultrasound transducer array is manipulated; wherein the generated acoustic vibrations heat the target site in the blood vessel or living tissue.

Optionally, the first and second jaw independently articulate between a first position and a second position.

Optionally, the distal end is configured to have at least one grasping feature.

Optionally, at least one of the first jaw or second jaw is moveable with respect to the other to constrain the blood vessel or living tissue between an open position and a closed position.

Optionally, the ultrasound transducer array comprises at least one piezoelectric crystal.

Optionally, each transducer of the ultrasound transducer array may be flat, curved in one plane, curved in multiple planes, or a combination of these.

Optionally, the transducers in the ultrasound transducer array are sized and shaped to substantially conform to the size of the blood vessel or living tissue to be grasped.

Optionally, the ultrasound transducer array comprises of a plurality of piezoelectric crystals connected with each other using a bonding material.

Optionally, the bonding material can be at least one of a metal or a rubber.

Optionally, width of the bonding material can be chosen based on the requirement.

Optionally, the ultrasound transducer array can deliver acoustic vibrations to the blood vessel or living tissue and sense an impact of the reflected acoustic vibrations on the blood vessel or living tissue.

Optionally, the reflecting surface comprises an acoustically reflective material configured to reflect the acoustic vibrations which have reached the reflecting surface after being transmitted through the blood vessel or living tissue.

Optionally, the acoustically reflective material can be a bio-compatible metal like stainless steel or titanium etc.

Optionally, the reflecting surface can be concave in shape.

Optionally, the parameters of the target site may include at least one of a resonant mode of the target site, tissue thickness, vessel thickness, blood flow in a vessel, temperature of the target site, and fibrinoid necrosis of a small blood vessel, etc.

Optionally, the manipulated drive signal applied to the ultrasound transducer array will generate acoustic vibrations at the resonant modes of the target site.

Optionally, the reflecting surface will help in focusing the acoustic vibrations at the target site of the grasped blood vessel or living tissue.

Optionally, the acoustic vibrations at the resonant modes will generate heat at the target site.

Optionally, the heat in the target site can be utilised for either sealing a blood vessel or cutting a living tissue.

Optionally, the heat in the target site can be generated based on either heat required for sealing a blood vessel or cutting a living tissue.

Optionally, the ultrasound transducer array can be made of plurality of transducers arranged in lengthwise or breadthwise manner.

Optionally, the manipulated drive signal may be applied to all or a selected few of the ultrasound transducer array.

Optionally, the acoustic vibrations are focused on the target site to achieve standing waves at the target site by desired interference between the acoustic vibrations regenerated into the tissue due to the ultrasound transducer array and the reflected acoustic vibrations from the reflecting surface.

Optionally, the reflecting surface may have a similar curvature as the ultrasound transducer array to reflect the acoustic vibrations back into the grasped blood vessel or living tissue.

Optionally, the ultrasound transducer array may include anyone of a temperature sensor, frequency sensor, PPG sensor, etc.

Optionally, the rotary joints facilitate roll, pitch, yaw, and opening/closing of the jaws.

Other embodiments, systems, methods, apparatus aspects, and features of the invention will become apparent to those skilled in the art from the following detailed description, the accompanying drawings, and the appended claims.

BRIEF DESCRIPTION OF THE DRAWINGS

The summary above, as well as the following detailed description of the disclosure, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to the scale. Wherever possible, like elements have been indicated by identical numbers.

Embodiments of the present disclosure will now be described, by way of example only, with reference to the following diagrams wherein.

DETAILED DESCRIPTION OF THE DISCLOSURE

Figure 1:
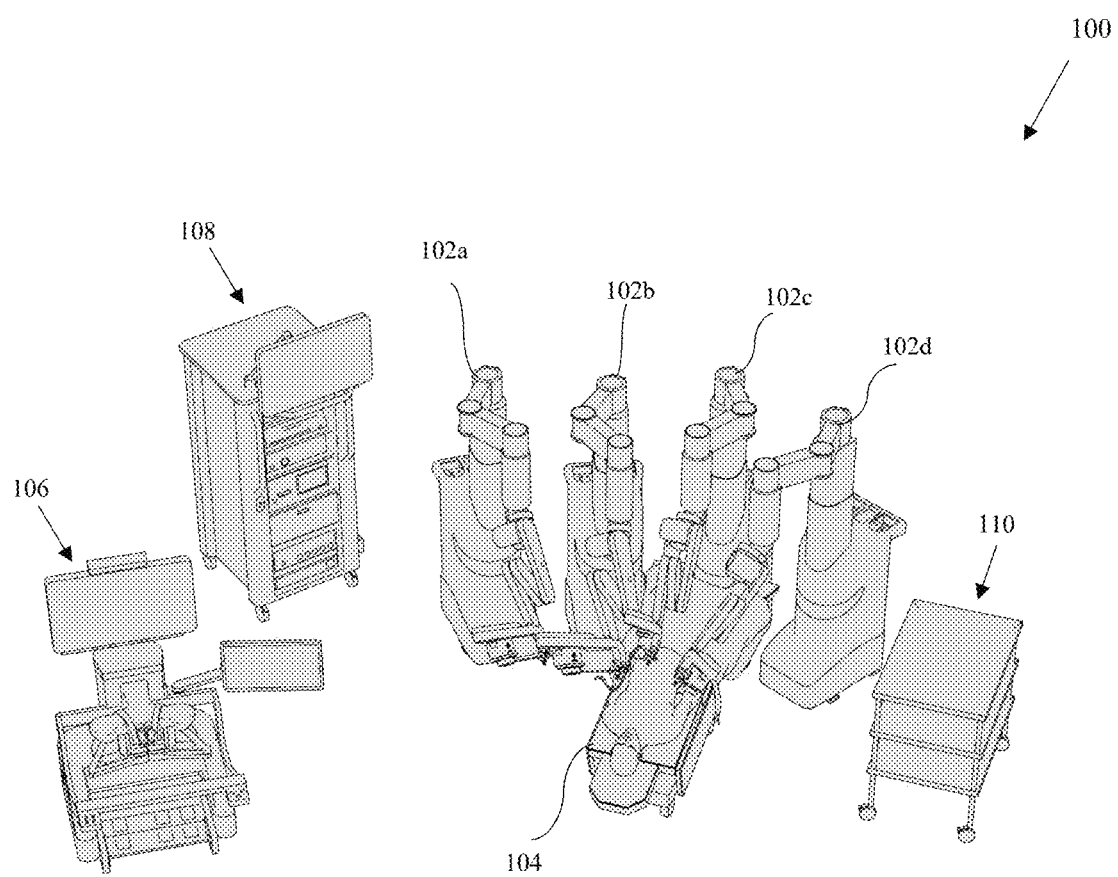
FIG. 1 illustrates an example implementation of a multi arm teleoperated surgical system which can be used with one or more features in accordance with an embodiment of the disclosure.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment", "an implementation", "another implementation" or similar language means that a particular feature, structure, or characteristic described in connection with the embodiment is included in at least one embodiment of the present disclosure. Thus, appearances of the phrase "in an embodiment", "in another embodiment", "in one implementation", "in another implementation", and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by one of ordinary skill in the art to which this disclosure belongs. The device, system, and examples provided herein are illustrative only and not intended to be limiting.

The terms "a" and "an" herein do not denote a limitation of quantity, but rather denote the presence of at least one of the referenced items. Further, the term sterile barrier and sterile adapter denotes the same meaning and may be used interchangeably throughout the description.

Embodiments of the disclosure will be described below in detail with reference to the accompanying drawings.

FIG. 1 illustrates an example implementation of a multi arm teleoperated robotic surgical system which can be used with one or more features in accordance with an embodiment of the disclosure. Specifically, FIG. 1 illustrates a multi arm robotic surgical system (100) having four robotic arms (102a), (102b), (102c), (102d) mounted on four robotic arm carts around an operating table (104). The four-robotic arms (102a), (102b), (102c), (102d) as depicted in FIG. 1 are for illustration purposes and the number of robotic arms may vary depending upon the type of surgery. The four robotic arms (102a), (102b), (102c), (102d) are arranged along the operating table (104) and may also be arranged in different manner but not limited to the robotic arms (102a), (102b), (102c), (1012d) arranged along the operating table (104). The robotic arms (102a), (102b), (102c), (102d) may be separately mounted on the four robotic arm carts or the robotic arms (102a), (102b), (102c), (102d) mechanically and/or electronically connected with each other or the robotic arms (102a), (102b), (102c), (102d) connected to a central body (not shown) such that the robotic arms (102a), (102b), (102c), (102d) branch out of a central body (not shown). Further, the multi arm teleoperated robotic surgical system (100) may include a surgeon console system (106), a vision cart (108), and an accessory table (110) for surgical instruments.

Figure 2A:
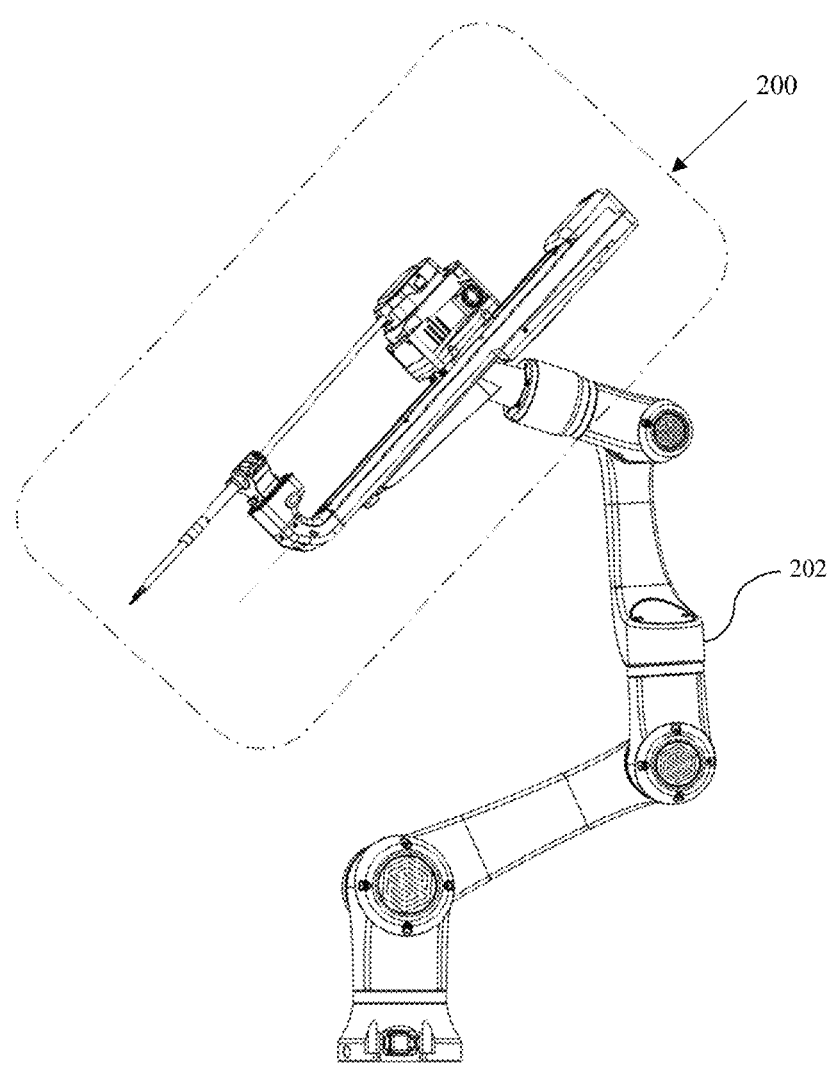
FIG. 2(a) illustrates a perspective view of a tool interface assembly mounted on a robotic arm in accordance with an embodiment of the disclosure.

FIG. 2(a) illustrates a perspective view of a tool interface assembly mounted on a robotic arm in accordance with an embodiment of the invention. The tool interface assembly (200) is mounted on the robotic arm (202) of the robotic surgical system (100) (shown in FIG. 1). The robotic arm (202) as shown in FIG. 2(a) is for the illustration purpose only and other robotic arms with different configurations, degree of freedom (DOF) and shapes may be used.

Figure 2B:
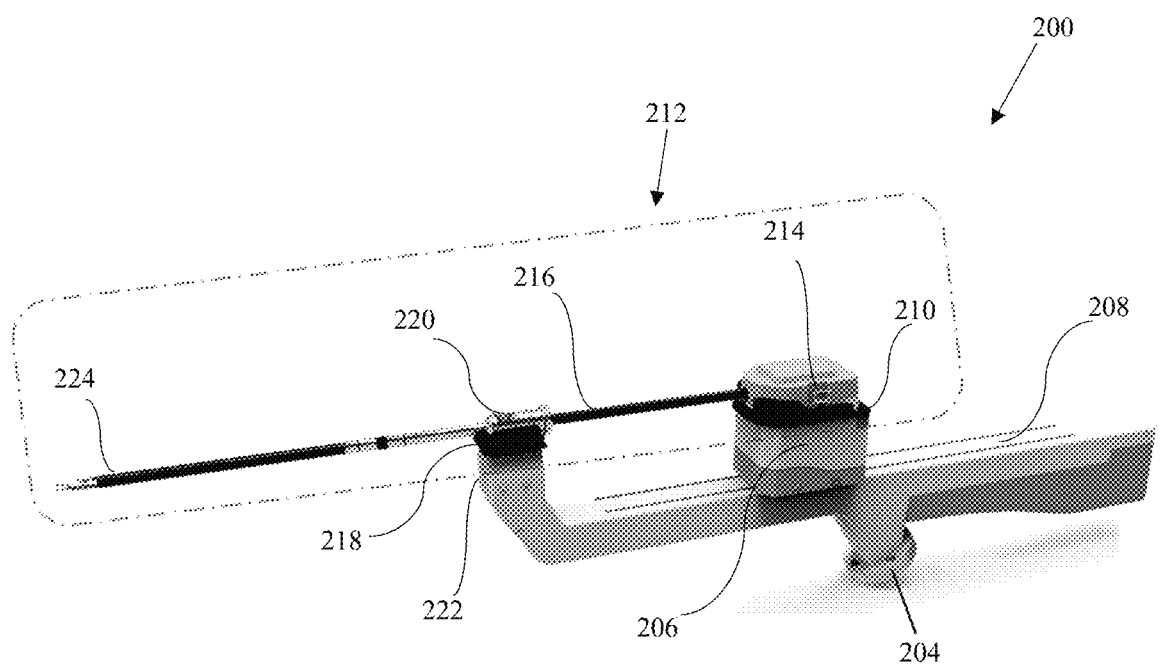
FIG. 2(b) illustrates a perspective view of the tool interface assembly in accordance with an embodiment of the disclosure.

FIG. 2(b) illustrates a perspective view of the tool interface assembly. The tool interface assembly (200), as depicted in the FIG. 2(b), comprises of an ATI (arm and tool interface) connector (204) which facilitates the tool interface assembly (200) to operationally connect with the robotic arm (shown in FIG. 2(a)). Further, the tool interface assembly (200) further comprises of an actuator assembly (206) mounted on a guiding mechanism and capable of linearly moving along the guiding mechanism. The guiding mechanism depicted in FIG. 2(b) is a guide rail (208). The movement of the actuator assembly (206) along the guide rail (208) is controlled by the surgeon with the help of controllers on the surgeon console system (106) as shown in FIG. 1. A sterile adapter assembly (210) is releasably mounted on the actuator assembly (206) to separate a non-sterile part of the robotic arm from a sterile surgical tool assembly (212). A locking mechanism (not shown) is provided to releasably lock and unlock the sterile adapter assembly (210) with the actuator assembly (206). The sterile adapter assembly (210) detachably engages from the actuator assembly (206) which drives and controls the sterile surgical instrument in a sterile field. In another embodiment, the surgical tool assembly (212) also may releasably lock/unlock or engage/disengage with the sterile adapter assembly (210) by means of a push button (214).

The surgical tool assembly (212) includes a shaft (216) and end effector (224). The end effector (224) may comprise of a surgical instrument or may be configured to attach a surgical instrument. Further, the end effector (224) may include a functional mechanical degree of freedom, such as jaws that open or close, or a knife that translates along a path. The surgical tool assembly (212) may also contain stored (e.g., on a semiconductor memory inside the instrument) information that may be permanent or may be updatable by the robotic surgical system (100).

According to an embodiment, the end effector (224) can be an ultrasonic surgical device for sealing vessels or transecting tissue in a minimally invasive surgical procedure. The ultrasonic surgical device may be used for open surgical procedures, laparoscopic, or endoscopic surgical procedures including robotic-assisted procedures. The ultrasonic surgical device may be used as a standalone device or adapted for use with and controlled by a surgical robotic platform. The ultrasonic surgical device may use piezo crystal which moves when a voltage is applied. By changing amplitude and frequency characteristics of applied voltage we can create vibrations. This creates ultrasonic vibrations in the crystal which in turn create ultrasonic pressure waves at the surface of the crystal, that travel away perpendicular to the surface. This type of ultrasound is usually called direct therapeutic ultrasound (DTU) as the instrument is directly in contact with tissue/vessel. These pressure waves (or sound waves) vibrate the tissue grasped in the jaws of the ultrasonic surgical device causing friction. Thereby, the friction may generate heat and the heat can be used to seal vessels or transect tissue.

Figure 3A:
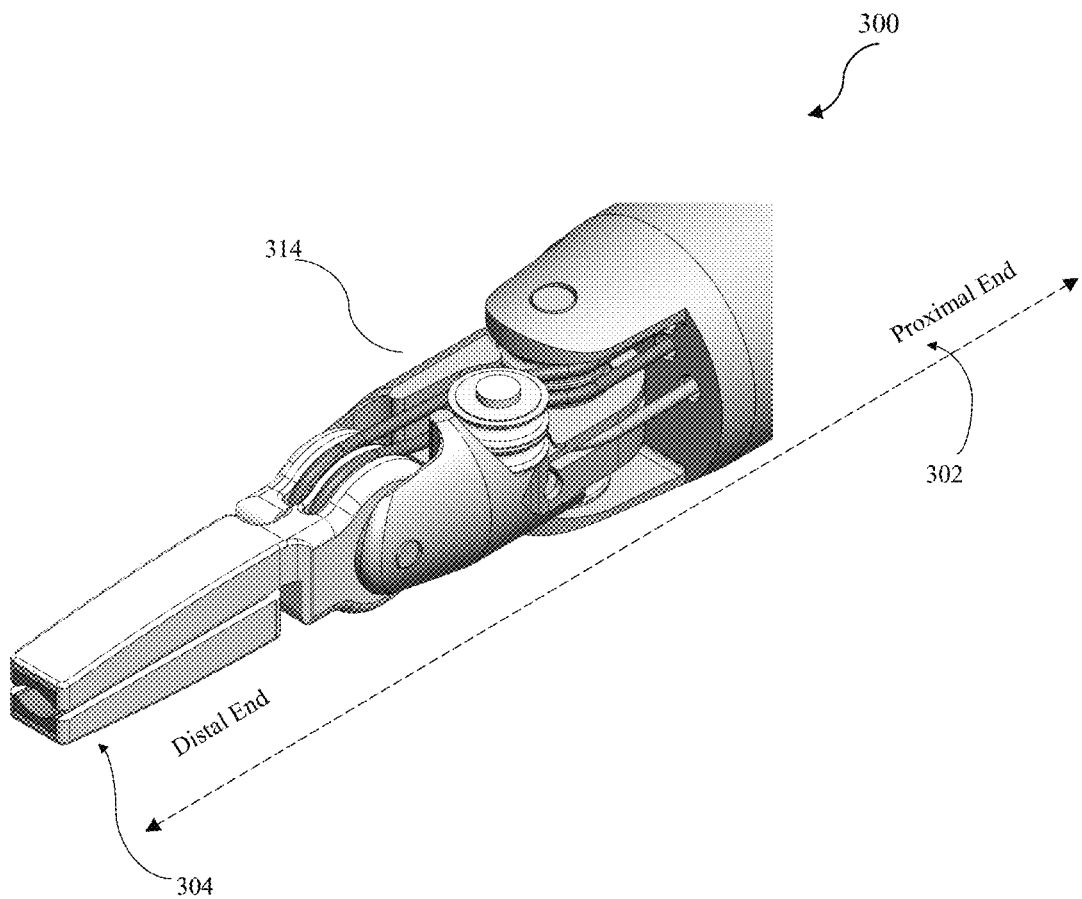
FIG. 3(a) illustrates a distal end of an ultrasonic surgical device with closed jaws position in accordance with an embodiment of the disclosure.
Figure 3B:
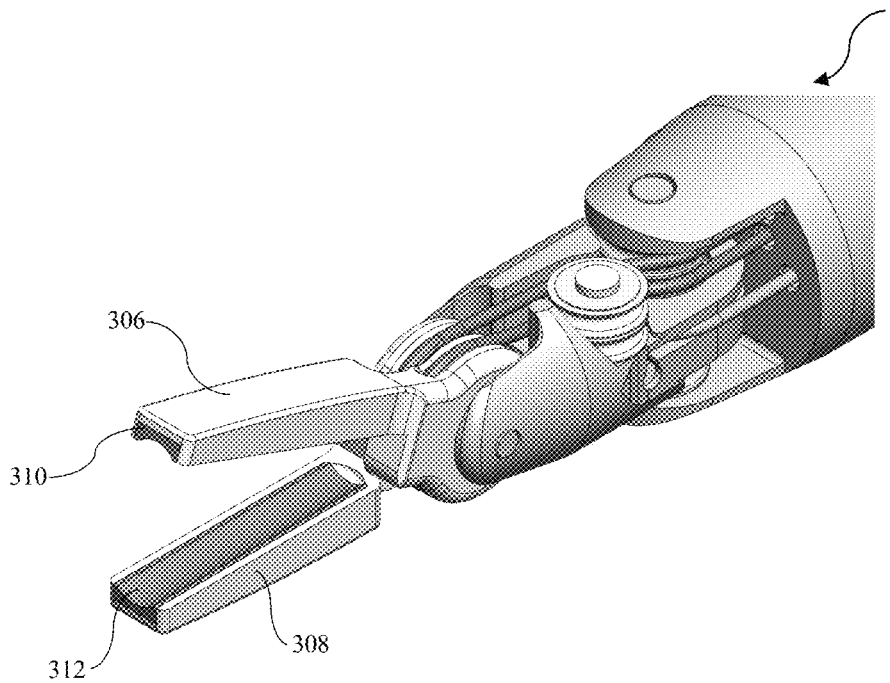
FIG. 3(b) illustrates a distal end of an ultrasonic surgical device with open jaws position in accordance with an embodiment of the disclosure.

FIG. 3(a) illustrates a distal end of an ultrasonic surgical device (300) with closed jaws position in accordance with an embodiment of the disclosure. FIG. 3(b) illustrates a distal end of an ultrasonic surgical device (300) with open jaws position in accordance with an embodiment of the disclosure. The ultrasonic surgical device (300) comprises of a proximal end (302) and a distal end (304). The distal end (304) comprises of a first jaw (306) and a second jaw (308). The distal end (304) with the first jaw (306) and second jaw (308) is configured to have a grasping feature to facilitate grasping of a blood vessel or a living tissue. The first jaw (306) and second jaw (308) can independently articulate between a first position and a second position. At least one of the first jaw (306) or second jaw (308) is moveable with respect to the other to constrain the blood vessel or living tissue between an open position and a closed position. The first jaw (304) comprises of an ultrasound transducer array (310). The second jaw (308) comprises of either a reflecting surface (312) or an ultrasound transducer array (312). The ultrasound transducer array (310), (312) comprises of at least a piezoelectric crystal. The ultrasound transducer array (310), (312) can be made of plurality of transducers arranged in lengthwise or breadthwise manner. Each transducer of the ultrasound transducer array (310), (312) may be flat, curved in one plane, curved in multiple planes, or a combination of these. The ultrasound transducer array (310), (312) comprise of a plurality of piezoelectric crystals connected with each other using a bonding material. The ultrasound transducer array (310), (312) may include anyone of a temperature sensor, frequency sensor, PPG sensor, etc. The bonding material can be at least one of a metal or a rubber. The width of the bonding material can be chosen based on the requirement. Alternatively, the ultrasound transducer array (310), (312) may also be designed to be made of multiple transducers connected to each other without any bonding material in between.

Figure 3C:
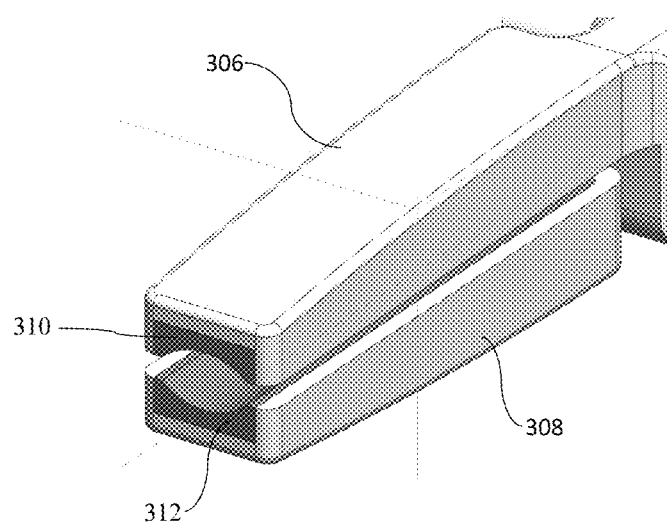
FIG. 3(c) illustrates another view of the distal end of an ultrasonic surgical device with closed jaws position in accordance with an embodiment of the disclosure.

The distal end (304) of the ultrasonic surgical device (300) is operationally secured to the elongated shaft (216) (shown in the FIG. 2(b)) by a wrist assembly (314). The other end of the elongated shaft (216) is secured to the tool interface assembly (200) (shown in the FIGS. 2(a)-2(b)). The proximal end is configured to apply a drive signal to the ultrasound transducer array (310), (312) of the distal end. The transducers in the ultrasound transducer array (310), (312) are sized and shaped to substantially conform to the size of a blood vessel or living tissue to be grasped. Firstly, a blood vessel, or a living tissue is grasped between the jaw assembly (304) having a first jaw (306) and second jaw (308). The jaw assembly (304) as shown in FIG. 3(c) is in a closed position after grasping the vessel or tissue to be sealed and/or transected. Then, a pulse of drive signal is applied to the ultrasound transducer array (310), (312) of the first jaw (306) and the second jaw (308), by a control system (not shown) of the robotic surgical system (100). The ultrasound transducer array (310), (312) is configured to deliver acoustic vibrations in the grasped blood vessel, or living tissue, based on the applied drive signal.

The ultrasound transducer array (310), (312) or the reflecting surface (312) is further configured to sense parameters of a target site on the grasped blood vessel, or living tissue, based on the received acoustic vibrations from the grasped blood vessel, or living tissue. The reflecting surface (312) of the second jaw (308) comprises of an acoustically reflective bio-compatible metal like stainless steel or titanium etc. The reflecting surface can be concave in shape. The parameters of the target site may include at least one of a resonant mode of the target site, tissue thickness, vessel thickness, blood flow in a vessel, temperature of the target site, and fibrinoid necrosis of a small blood vessel, etc. The reflecting surface (312) is configured to reflect the acoustic vibrations which have reached the reflecting surface (312) after being generated in the blood vessel or living tissue. Further, the reflecting surface (312) may have a similar curvature as the ultrasound transducer array (310), (312) to reflect the acoustic vibrations back into the grasped blood vessel or living tissue.

A surgeon performing the robotic surgery will provide input to the control system of a robotic surgical system (100), indicating whether a cutting or coagulation action needs to be performed on the target site on the blood vessel, or living tissue. The control system of the robotic surgical system (100) manipulates the applied drive signal to the ultrasound transducer array (310), (312), based on these sensed parameters of the target site and the input from the surgeon. The manipulated drive signal may be applied to all or a selected few of the ultrasound transducer array (310), (312). The applied manipulated drive signal to the ultrasound transducer array (310), (312) will generate acoustic vibrations at the resonant modes of the target site. The reflecting surface (312) will help in focussing the acoustic vibrations at the target site of the grasped blood vessel or living tissue. The acoustic vibrations are focused on the target site to achieve standing waves at the target site by desired interference between the acoustic vibrations sent from the tissue to the reflecting surface (312) and the reflected acoustic vibrations from the reflecting surface (312). These acoustic vibrations at the resonant modes will produce heat in the target site. The produced heat in the target site will be utilised for either sealing a blood vessel or cutting a living tissue. Thus, the heat in the target site can be generated based on either heat required for sealing a blood vessel or cutting a living tissue.

A plurality of rotary joints is provided at the distal end (304). The tool interface assembly (200) at the proximal end (302) may further comprise a plurality of discs operationally connected to the distal end (304) of the ultrasonic surgical device (300). The plurality of rotary joints facilitate roll, pitch, yaw and opening/closing of the jaw assembly (304) comprising of two jaws (306) and (308). The roll, pitch, and yaw are facilitated about the Z, X, and Y axes respectively. The yaw and pitch movement have a maximum limit of ±90°. The roll movement has a maximum limit of ±180°. The plurality of discs may operationally connect to the distal end (304) of the ultrasonic surgical device (300) by the cables to facilitate in actuation of the distal end (304) to seal vessels or transect tissue. In an embodiment, the elongated shaft (216) may be a fixed shaft, rotating shaft, or combination thereof. Further, the wrist assembly (314) may be an articulated end-effector or wristed end-effector. Ultrasonic surgical instruments can be used for open surgical procedures, laparoscopic, or endoscopic surgical procedures including robotic-assisted procedures. FIG. 3(c) illustrates another view of the distal end (304) of an ultrasonic surgical device (300) with closed jaws position in accordance with an embodiment of the disclosure.

Figure 4A:
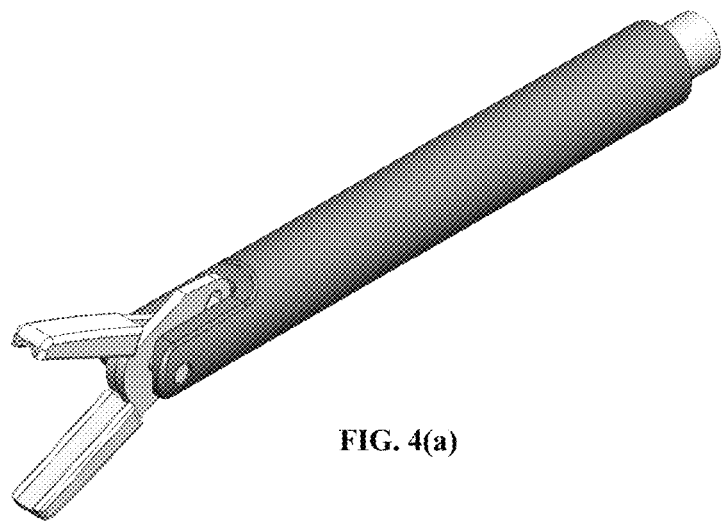
FIG. 4(a)-4(d) illustrates a manually controlled ultrasonic surgical device configuration in accordance with an embodiment of the disclosure.
Figure 4B:
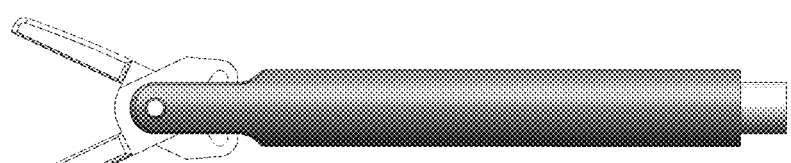
Figure 4C:
Figure 4D:
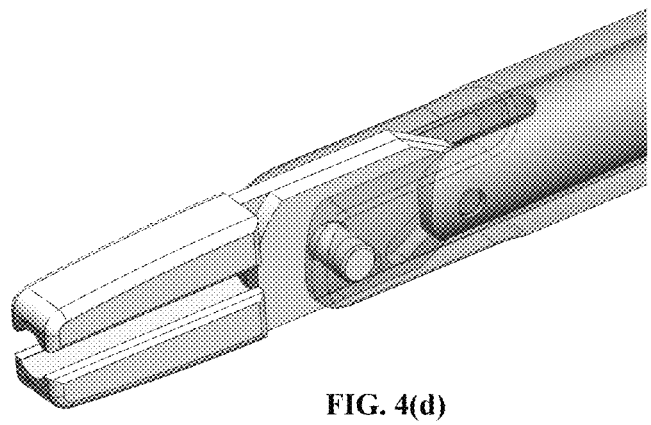

FIGS. 4(a)-4(d) illustrate a manually controlled ultrasonic surgical device (300) with various configurations in accordance with an embodiment of the disclosure. FIGS. 4(b) and 4(c) illustrate the distal end (304) with first jaw (306) and the second jaw (308) in an open and clamped state for a simple straight shaft device capable of axial rotation. A co-axial shaft is present to clamp the device jaws (306) and (308). It can be used with a suitable handle like a pistol grip, in-line etc.

Figure 5A:
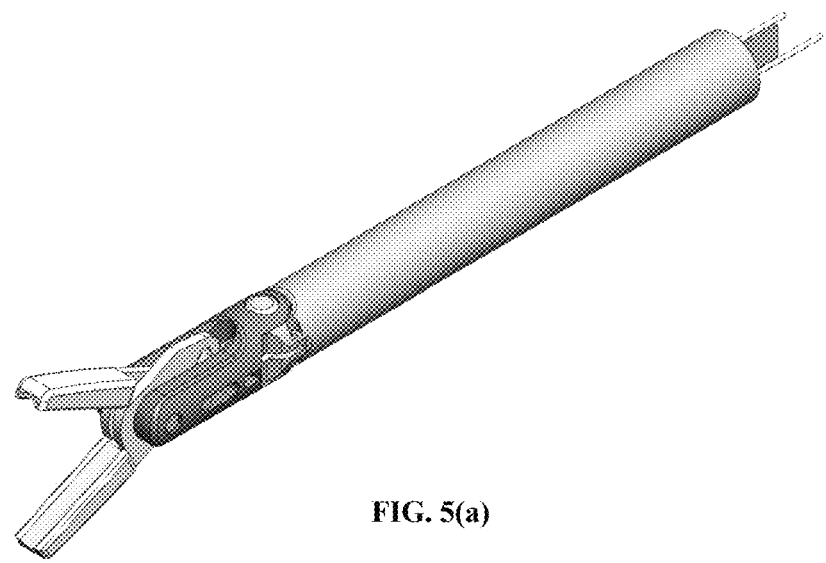
FIG. 5(a)-5(e) illustrates an ultrasonic surgical device with an articulating distal end configuration in accordance with an embodiment of the disclosure.
Figure 5B:
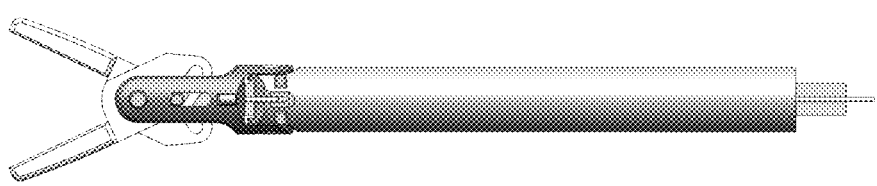
Figure 5C:
Figure 5D:
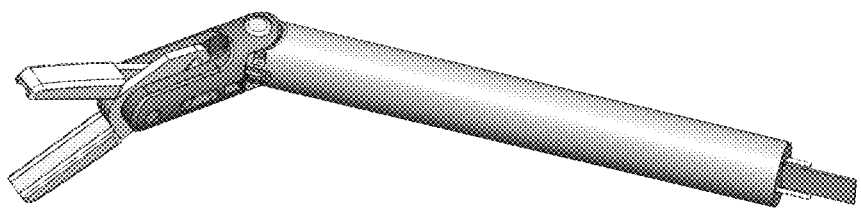
Figure 5E:
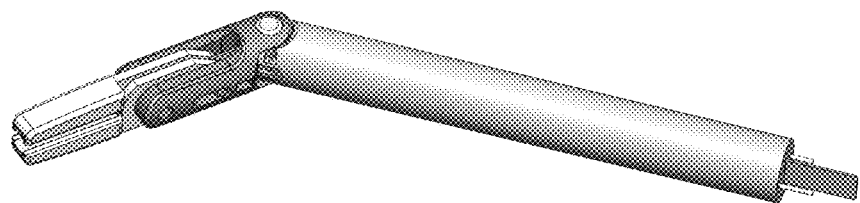

FIGS. 5(a)-5(c) illustrate the ultrasonic surgical device (300) with an articulating distal end (304) configuration in accordance with an embodiment of the disclosure. Articulating and/or wristed surgical instruments have been developed extensively for almost every major surgical instrument type from simple devices like scissors and graspers to complex devices like endoscopic linear staples, and clip appliers. The articulated and/or wristed surgical instrumentation provides improved access and visualization for improved surgical outcomes. FIG. 5(a) illustrates a simple articulated device (300) capable of axial rotation and distal articulation in both pitch and yaw axis by means of the present rotary joint. FIGS. 5(b) and 5(c) show the straight device in open and clamped configurations. FIGS. 5(d) and 5(e) show the articulated device in open and clamped configurations.

Figure 6A:
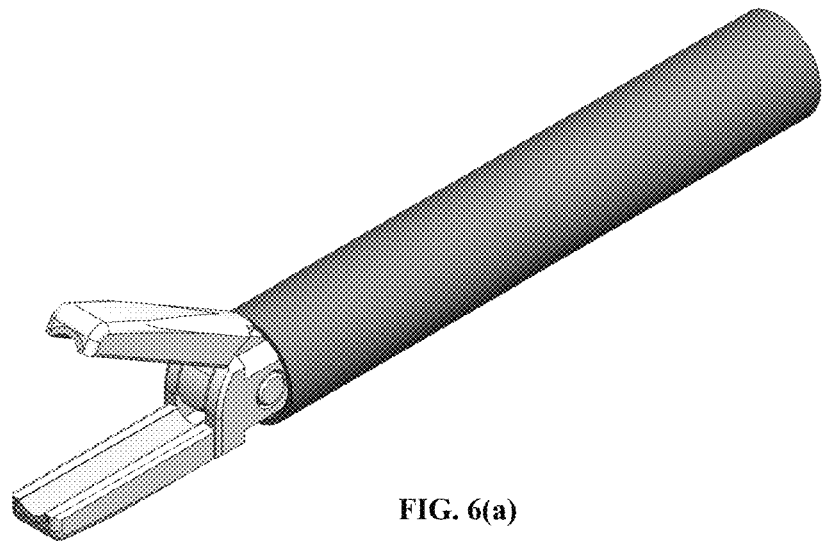
FIG. 6(a)-6(d) illustrates an ultrasonic surgical device with a cam tube configuration in accordance with an embodiment of the disclosure.
Figure 6B:
Figure 6C:
Figure 6D:
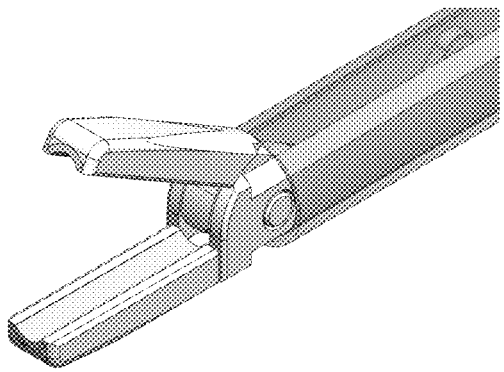

FIGS. 6(a)-6(d) illustrate ultrasonic surgical device (300) with a cam tube configuration in accordance with an embodiment of the disclosure. FIG. 6(a) shows an ultrasonic surgical device (300) with a moveable jaw (306) and other stationary jaw (308), capable of axial rotation, and a cam tube closure. This instrument (300) can be used with handles of any type. FIGS. 6(b) and 6(c) show the instrument (300) in open and clamped configuration.

Figure 7A:
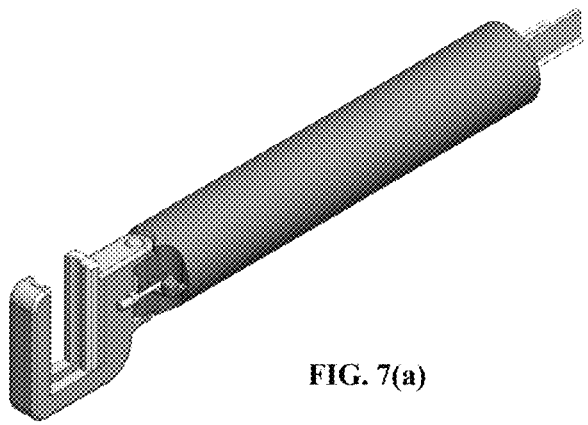
FIG. 7(a)-7(e) illustrates an ultrasonic surgical device with C-shape distal end configuration in accordance with an embodiment of the disclosure.
Figure 7B:
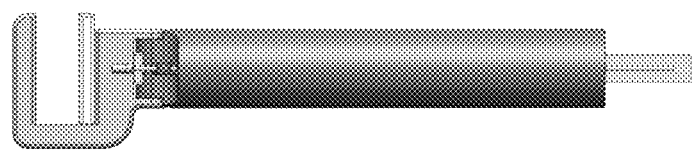
Figure 7C:
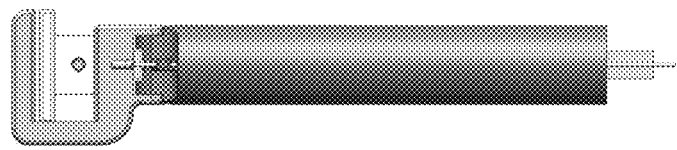
Figure 7D:
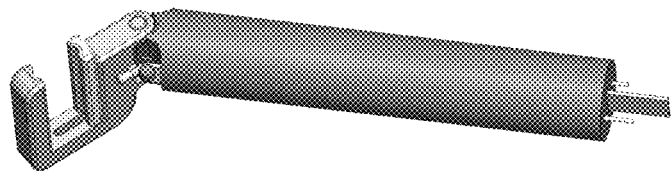
Figure 7E:
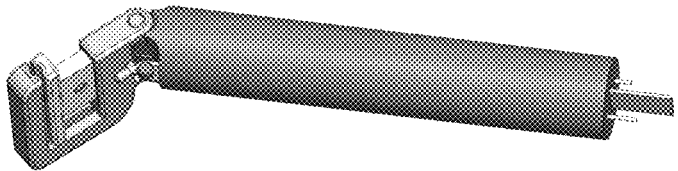

FIGS. 7(a)-7(c) illustrate ultrasonic surgical device (300) with a C-shape distal end configuration in accordance with an embodiment of the disclosure. FIG. 7(a) represents a C-shape device capable of axial rotation and distal rotation. The instrument (300) can be used with handles of any type. FIGS. 7(b) and 7(c) show straight C-shape device in open and clamped configuration. FIGS. 7(d) and 7(e) show articulated C-shape device in open and clamped configuration.

Figure 8A:
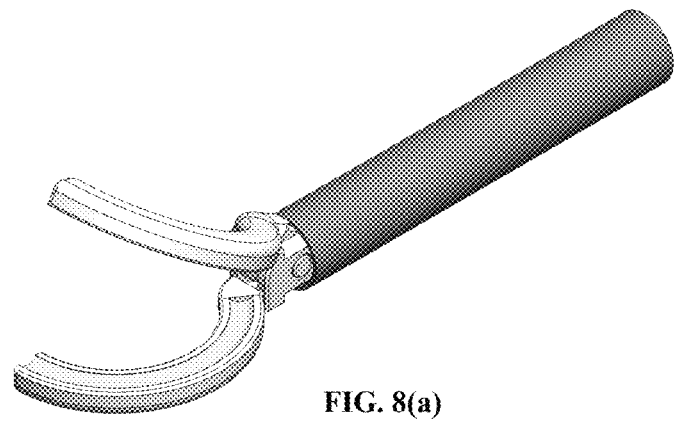
FIG. 8(a)-8(d) illustrates an ultrasonic surgical device with Curved shape distal end configurations in accordance with an embodiment of the disclosure.
Figure 8B:
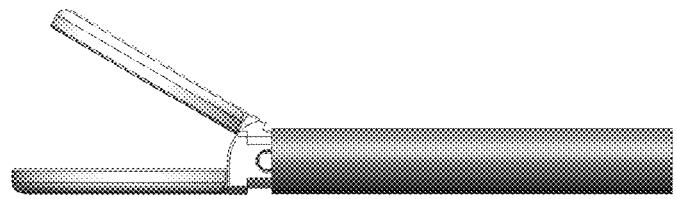
Figure 8C:
Figure 8D:
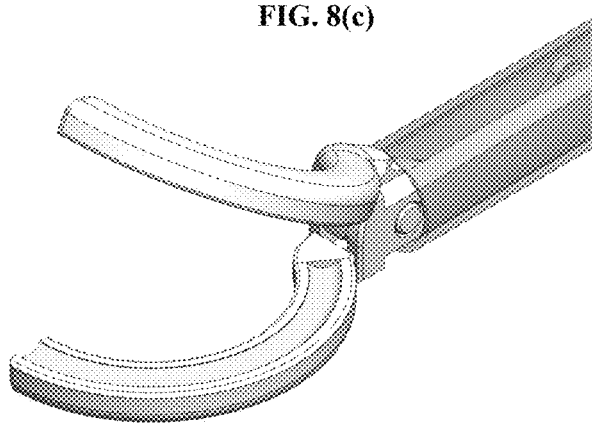

FIGS. 8(a)-8(d) illustrate ultrasonic surgical device (300) with a curved shape distal end configuration in accordance with an embodiment of the disclosure. FIG. 8(a) shows a curved jaw device, capable of axial rotation. The device has a cam tube closure, and any suitable handle can be used. FIGS. 8(b) and 8(c) show an ultrasonic surgical device (300) with a curved shape distal end (304) in open and closed modes.

Figure 9A:
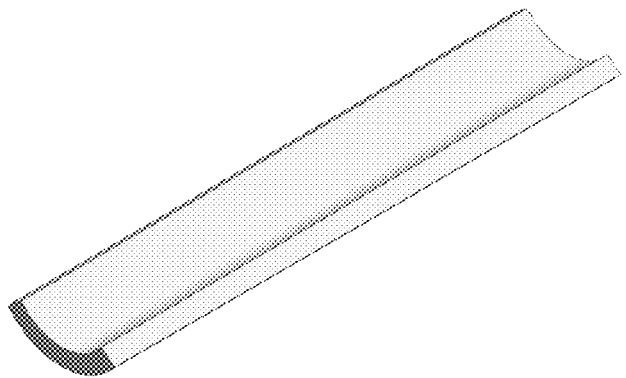
FIG. 9(a)-9(k) illustrates various transducer configurations and respective generated vibrations in accordance with an embodiment of the disclosure.
Figure 9B:
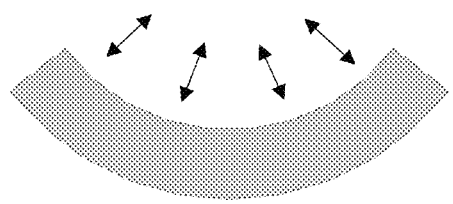
Figure 9C:
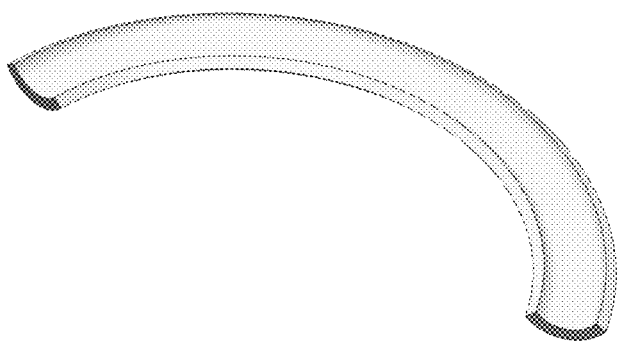
Figure 9D:
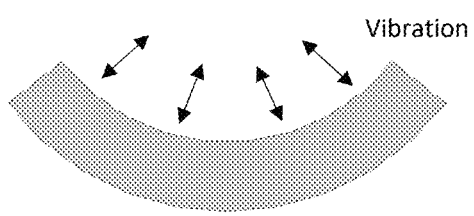
Figure 9E:
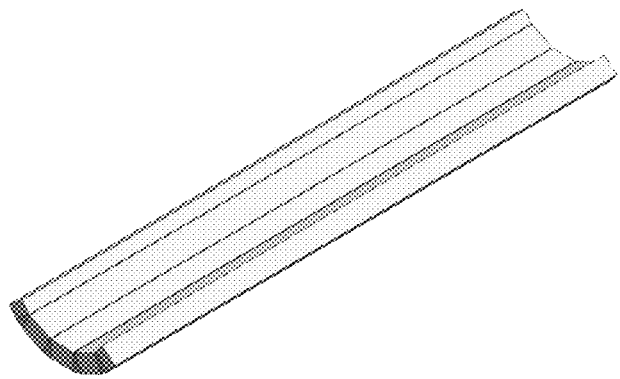
Figure 9F:
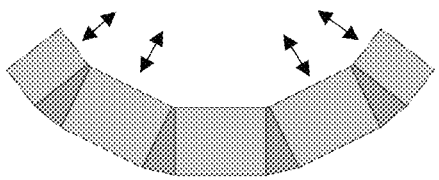
Figure 9G:
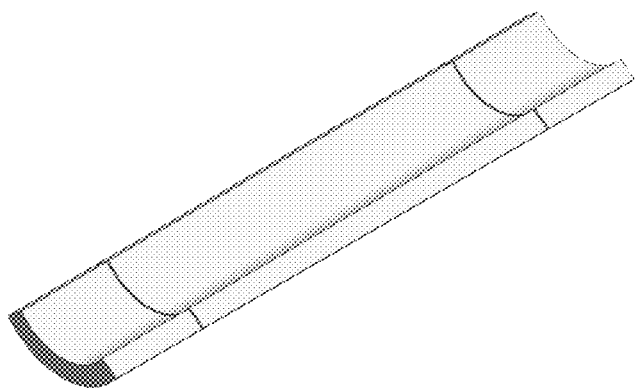
Figure 9H:
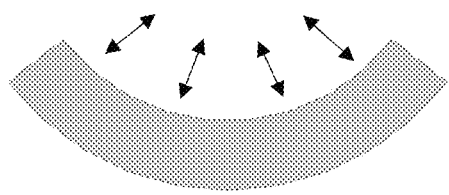
Figure 9I:
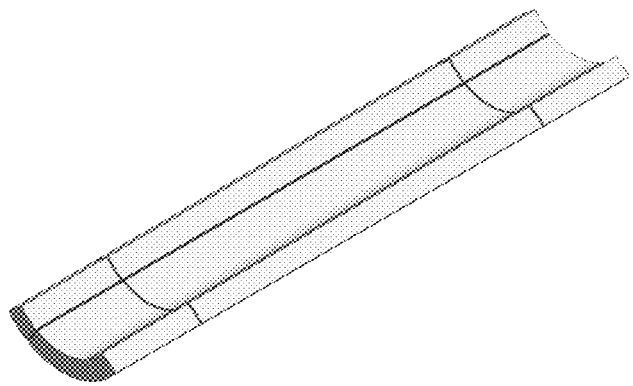
Figure 9J:
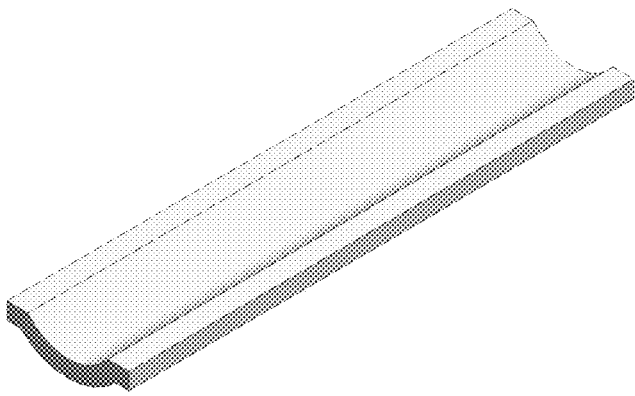
Figure 9K:
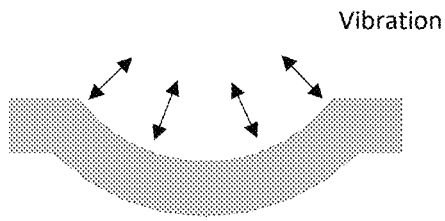

FIGS. 9(a)-9(d) illustrate various transducer configurations in accordance with an embodiment of the disclosure. FIGS. 9(a) and 9(b) show a single transducer with a curved shape and generated vibrations respectively. FIGS. 9(c) and 9(d) show a single transducer with a double curved shape and generated vibrations respectively. FIGS. 9(e) and 9(f) show a transducer with multiple flat piezo elements and generated vibrations respectively. FIGS. 9(g) and 9(h) show a transducer with multiple curved piezo elements and generated vibrations respectively. FIGS. 9(i)-9(j) and 9(k) show a compound transducer with a mix of straight and curved piezo elements and generated vibrations respectively. The transducer may be a single piezo or it may be composed of several piezoelectric elements to create an array. When configured as an array of piezoelectric elements, the acoustic performance of each element of the array may be customized to create an optimal energy field for tissue coagulation, ablation, or transection. In addition, if multiple articulating elements are used, they may be customized in terms of position or have a curvature to further optimize the performance.

Figure 10A:
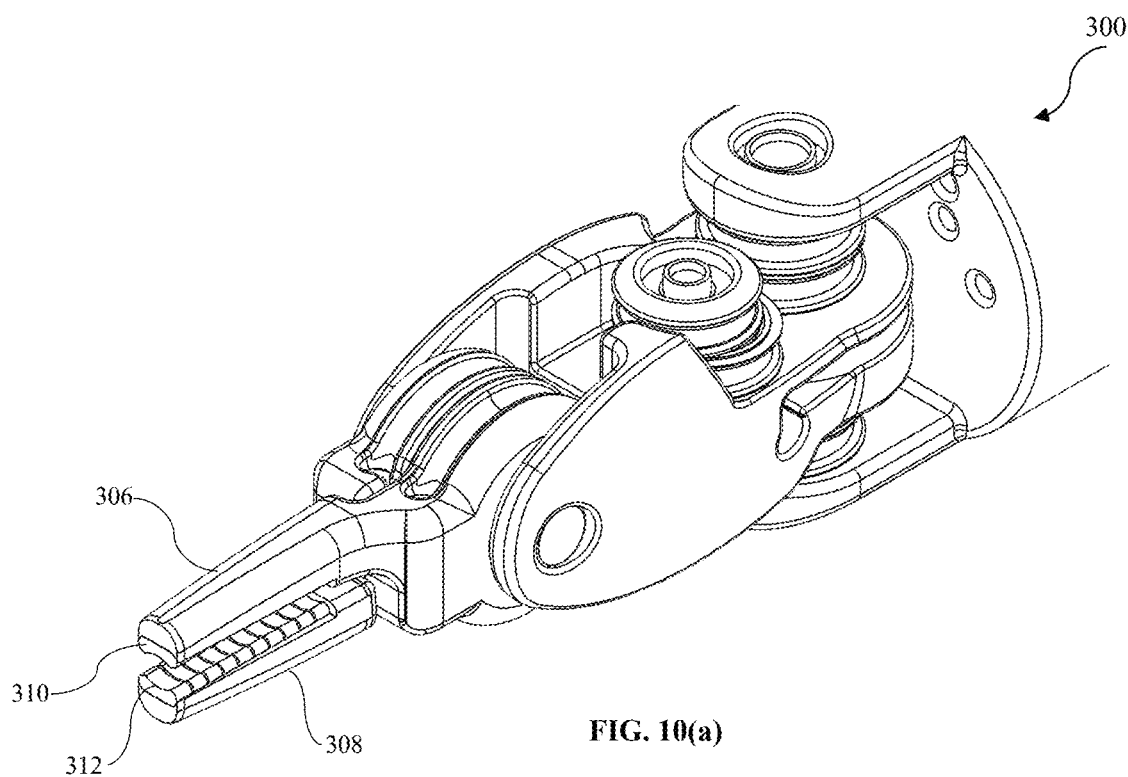
FIG. 10(a) illustrates a transducer configuration using multiple piezoelectric elements divided perpendicular to the axis of the shaft in accordance with an embodiment of the disclosure.
Figure 10B:
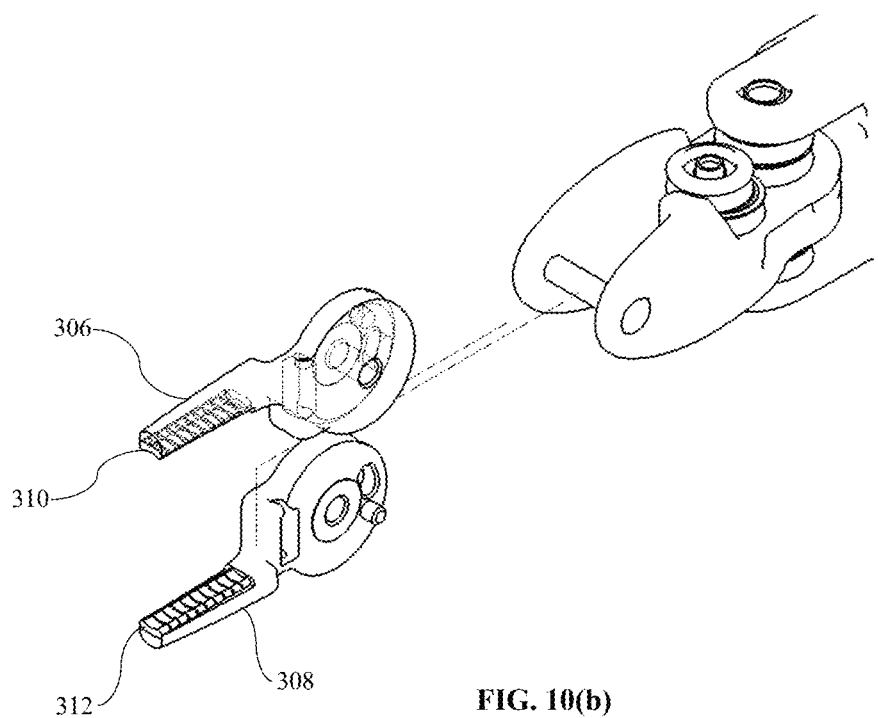
FIG. 10(b) illustrates an exploded view of the configuration using multiple piezoelectric elements divided perpendicular to the axis of the shaft in accordance with an embodiment of the disclosure.

FIG. 10(a) illustrates a desired configuration of the ultrasonic surgical device (300). The first jaw (306) and the second jaw (308) have ultrasound transducer array (310), (312), which utilize multiple piezoelectric elements divided perpendicular to the axis of the shaft to provide required energy and position customization to focus the generated ultrasound onto the blood vessel or tissue. FIG. 10(b) represents an exploded view of the configuration using multiple piezoelectric elements divided perpendicular to the axis of the shaft, depicting both the jaws (306) and (308) and the transducer.

Figure 11A:
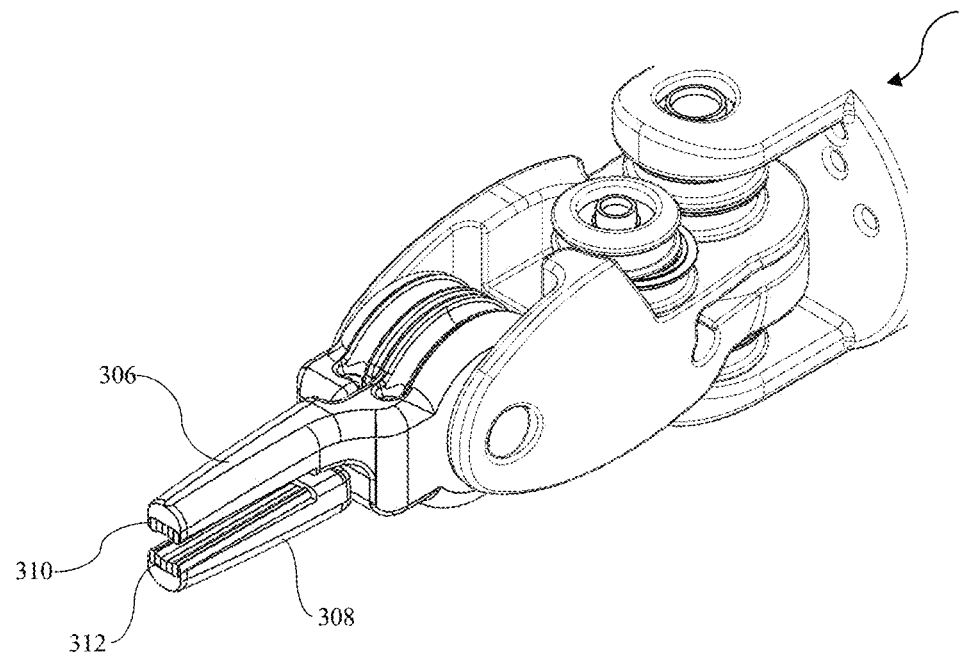
FIG. 11(a) illustrates a transducer configurations using multiple piezoelectric elements divided along the axis of the shaft in accordance with an embodiment of the disclosure.
Figure 11B:
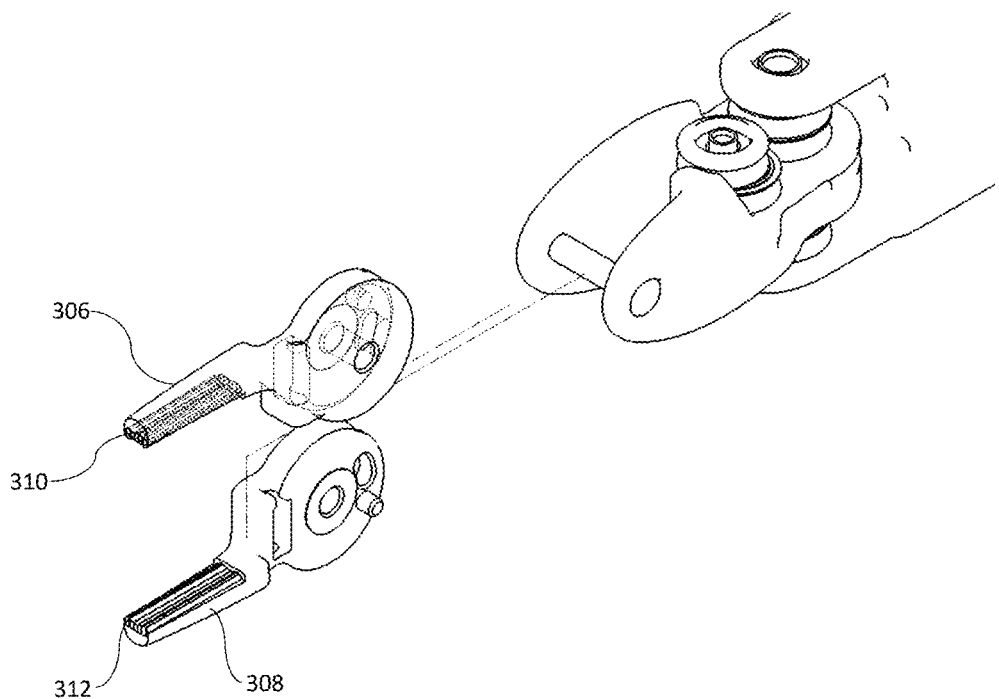
FIG. 11(b) illustrates an exploded view of the configuration using multiple piezoelectric elements divided along the axis of the shaft in accordance with an embodiment of the disclosure.

FIG. 11(a) illustrates a desired configuration of the ultrasonic surgical device (300). The first jaw (306) and the second jaw (308) have ultrasound transducer array (310), (312), which utilize multiple piezoelectric elements divided along the axis of the shaft to provide required energy and position customization to focus the generated ultrasound onto the blood vessel or tissue. FIG. 11(b) represents an exploded view of the configuration using multiple piezoelectric elements divided along the axis of the shaft, depicting both the jaws (306) and (308) and the transducer.

Figure 12A:
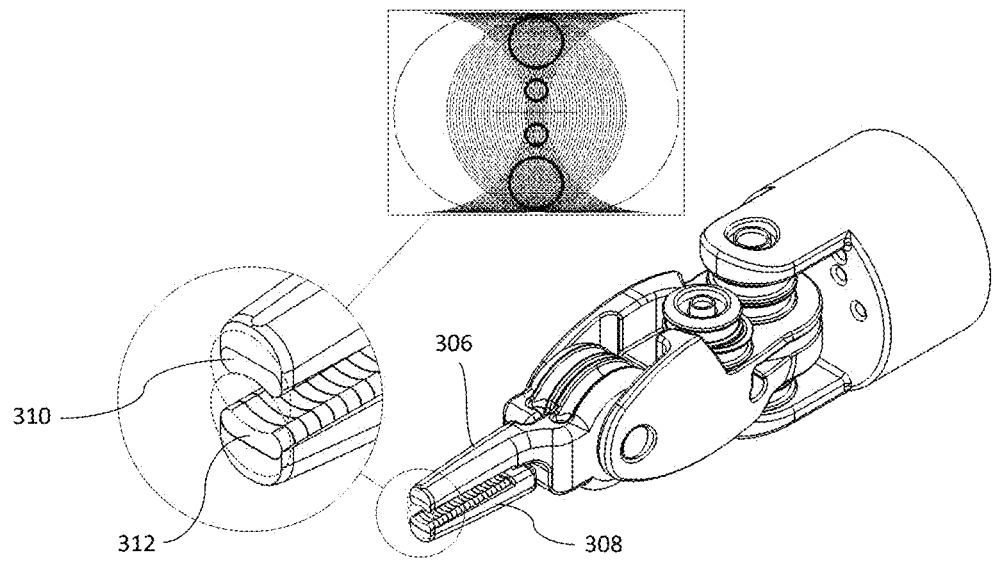
FIG. 12(a) illustrates a mode of operation for the embodiment shown in FIG. 10(a) with an ultrasound energy density attained to coagulate the tissue/vessel in accordance with an embodiment of the disclosure.
Figure 12B:
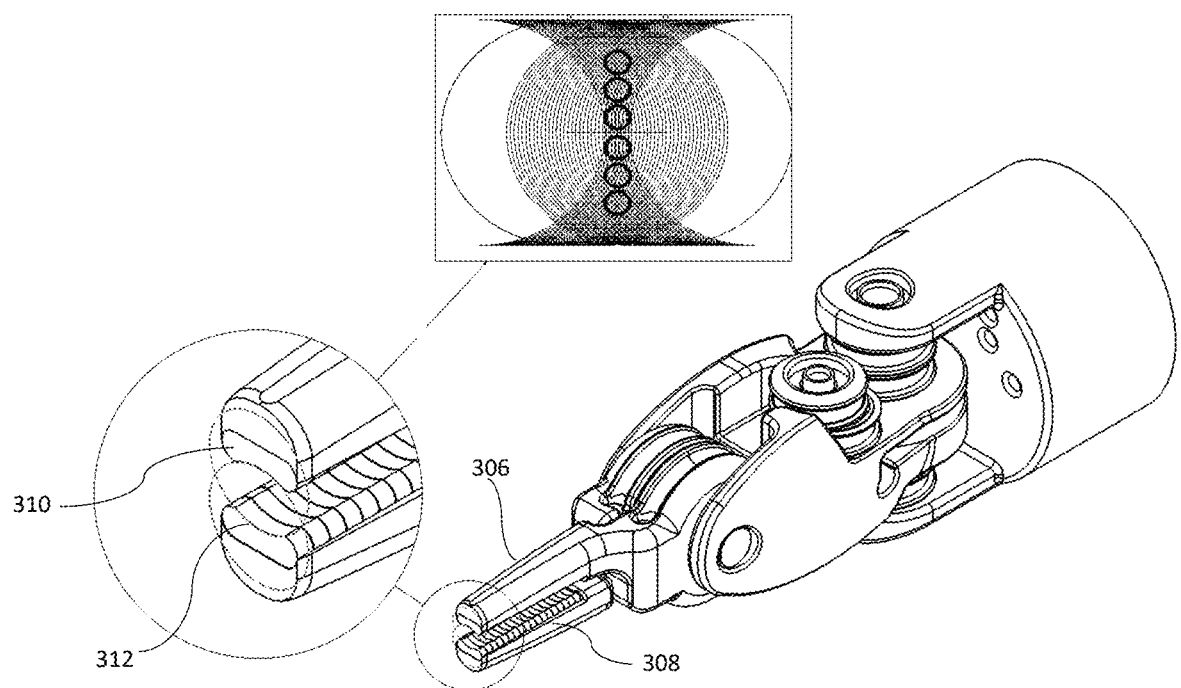
FIG. 12(b) illustrates a mode of operation for the embodiment shown in FIG. 10(a) with an ultrasound energy density attained to cut the tissue/vessel in accordance with an embodiment of the disclosure.

FIG. 12(a) illustrates a mode of operation for the embodiment shown in FIG. 10(a) with an ultrasound energy configured to coagulate the tissue/vessel based on an input provided by a surgeon and the sensed parameters of the target site. The amount of energy focused and generated may be measured with appropriate sensors to provide continuous feedback to the control system to verify the completion of the required process. FIG. 12(b) illustrates a mode of operation for the embodiment shown in FIG. 10(a) with an ultrasound energy configured to cut the tissue/vessel based on an input provided by a surgeon. The thermal energy created is configured to be focused near the center to provide the highest concentration of energy and avoid any external leakage. Further, feedback may be provided to continuously vary the input drive signal.

Figure 13A:
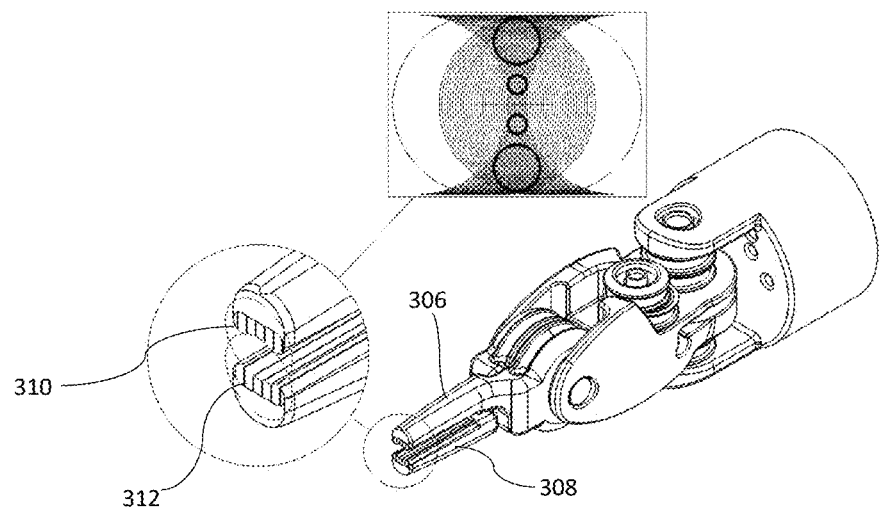
FIG. 13(a) illustrates a mode of operation for the embodiment shown in FIG. 11(a) with an ultrasound energy density attained to coagulate the tissue/vessel in accordance with an embodiment of the disclosure.
Figure 13B:
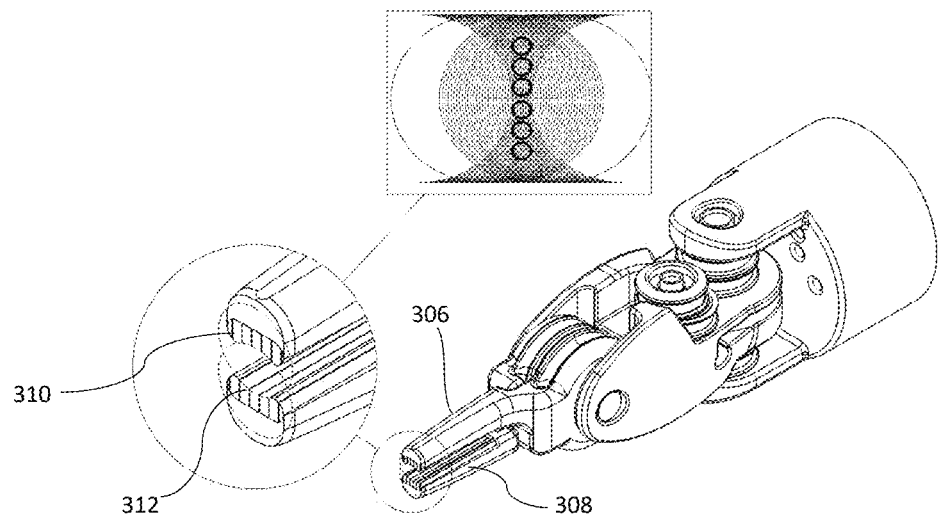
FIG. 13(b) illustrates a mode of operation for the embodiment shown in FIG. 11(a) with an ultrasound energy density attained to cut the tissue/vessel in accordance with an embodiment of the disclosure.

FIG. 13(a) illustrates a mode of operation for the embodiment shown in FIG. 11(a) with an ultrasound energy configured to coagulate the tissue/vessel based on an input provided by a surgeon and the sensed parameters of the target site. The amount of energy focused and generated may be measured with appropriate sensors to provide continuous feedback to the control system to verify the completion of the required process. FIG. 13(b) illustrates a mode of operation for the embodiment shown in FIG. 11(a) with an ultrasound energy configured to cut the tissue/vessel based on an input provided by a surgeon. The thermal energy created is configured to be focused near the center to provide the highest concentration of energy and avoid any external leakage. Additionally, feedback may be provided to continuously vary the input drive signal.

Figure 14A:
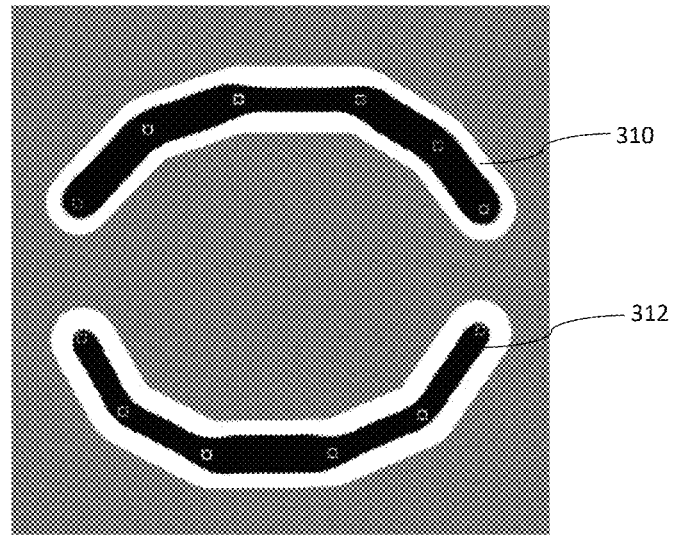
FIG. 14(a) illustrates a configuration of ultrasonic surgical device with both jaws comprising transducers in accordance with an embodiment of the disclosure.
Figure 14B:
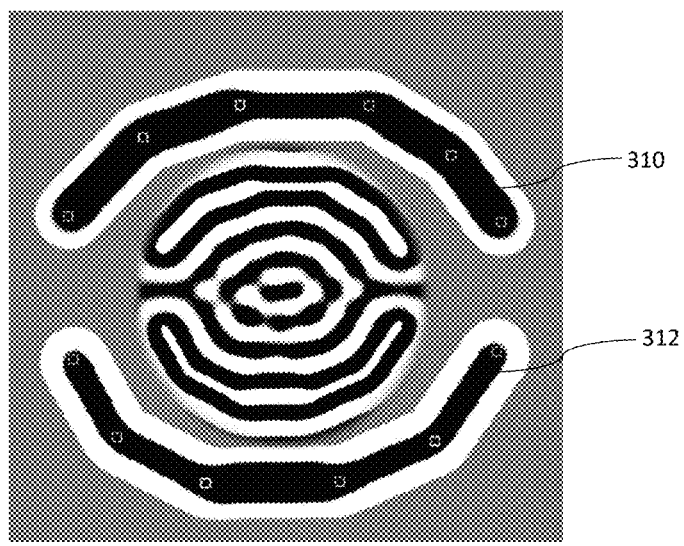
FIG. 14(b) illustrates a 2D standing wave configuration for using both jaws as transducers in accordance with an embodiment of the disclosure.

FIG. 14(a) represents a configuration with the first jaw (306) and the second jaw (308) having an ultrasonic transducer array (310), (312) respectively. FIG. 14(b) represents the generated standing waves when both the jaws (306) and (308) are in the configuration shown in FIG. 14(a).

Figure 15A:
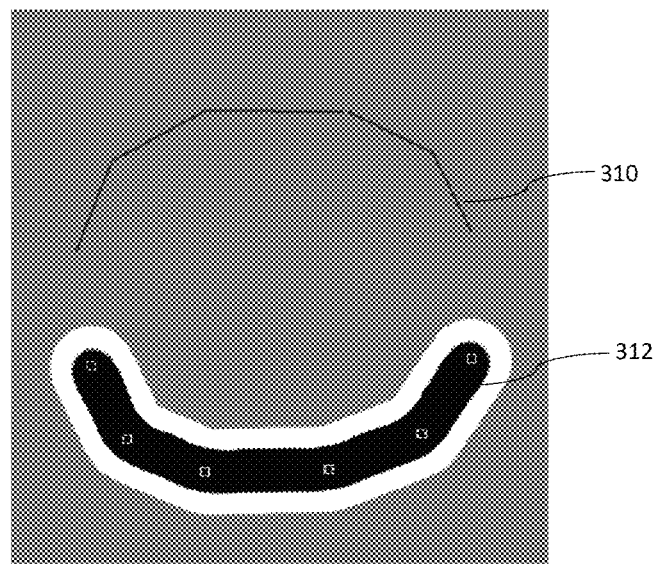
FIG. 15(a) illustrates a configuration of ultrasonic surgical device with one jaw comprising a transducer and another jaw comprising a reflector in accordance with an embodiment of the disclosure.
Figure 15B:
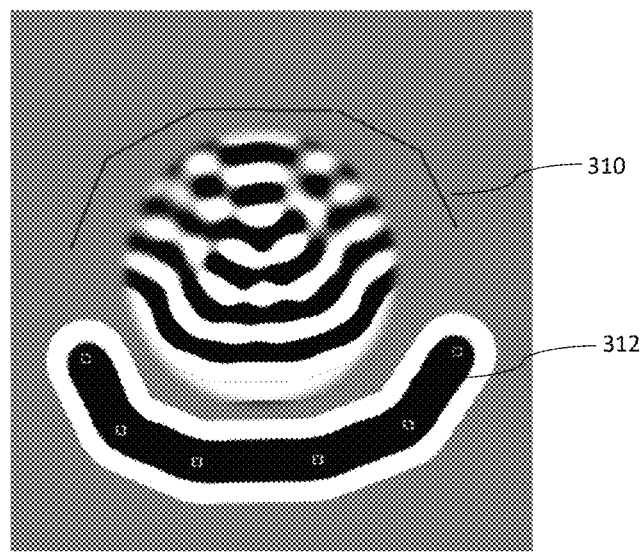
FIG. 15(b) illustrates a 2D standing wave configuration for using one jaw comprising a transducer and another jaw comprising a reflector in accordance with an embodiment of the disclosure.

FIG. 15(a) represents a configuration with the first jaw (306) comprising an ultrasonic transducer array (310) and the second jaw (308) comprising a reflecting surface (312). FIG. 15(b) represents the generated standing waves when both the jaws (306) and (308) are in the configuration shown in FIG. 15(a).

Figure 16A:
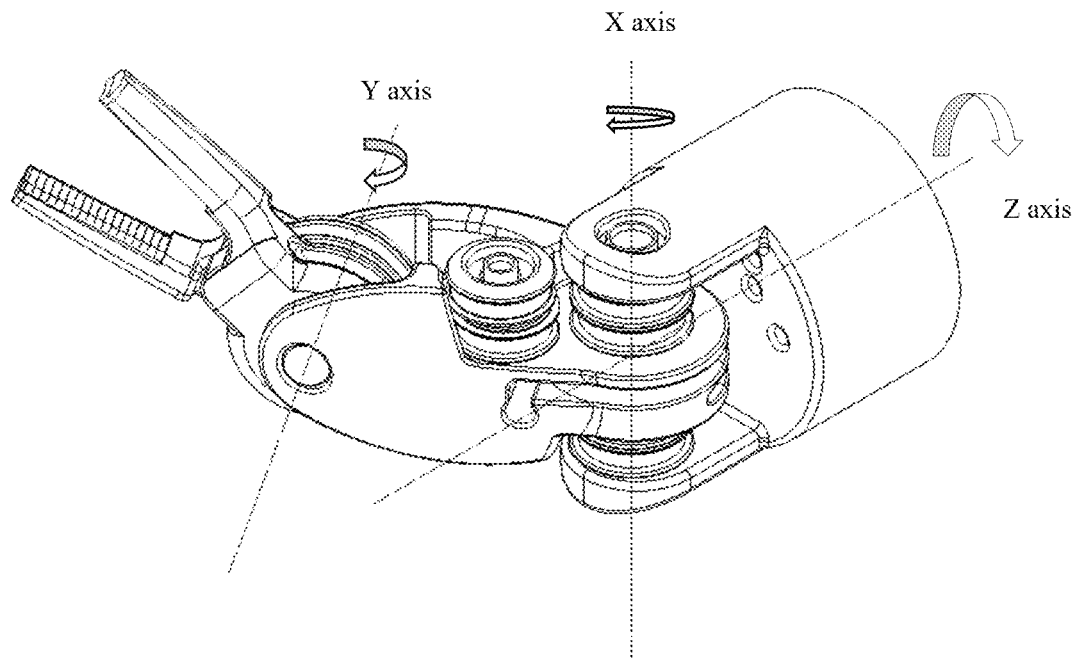
FIG. 16(a) illustrates an open jaws configuration of ultrasonic surgical device with articulation along the Roll, Yaw, and Pitch axis in accordance with an embodiment of the disclosure.
Figure 16B:
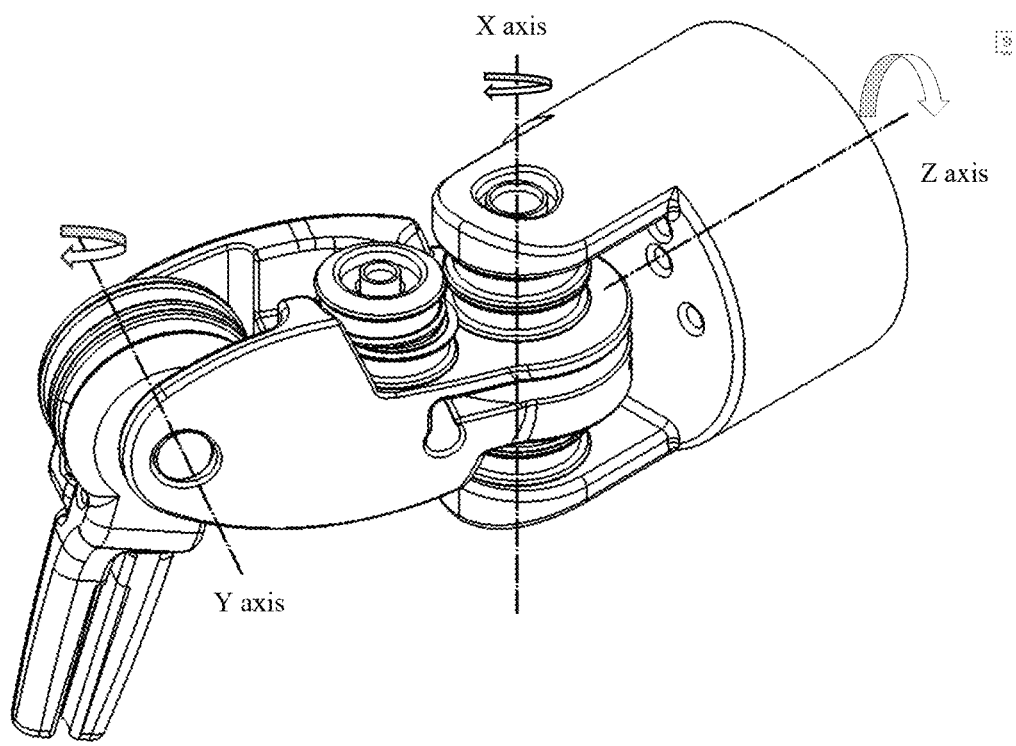
FIG. 16(b) illustrates a closed jaws configuration of ultrasonic surgical device with articulation along the Roll, Yaw, and Pitch axis in accordance with an embodiment of the disclosure.

FIGS. 16(a) and 16(b) represent articulation of the ultrasonic surgical device (300). The roll, pitch, and yaw movements are facilitated about the Z, X, and Y axes respectively.

Figure 17:
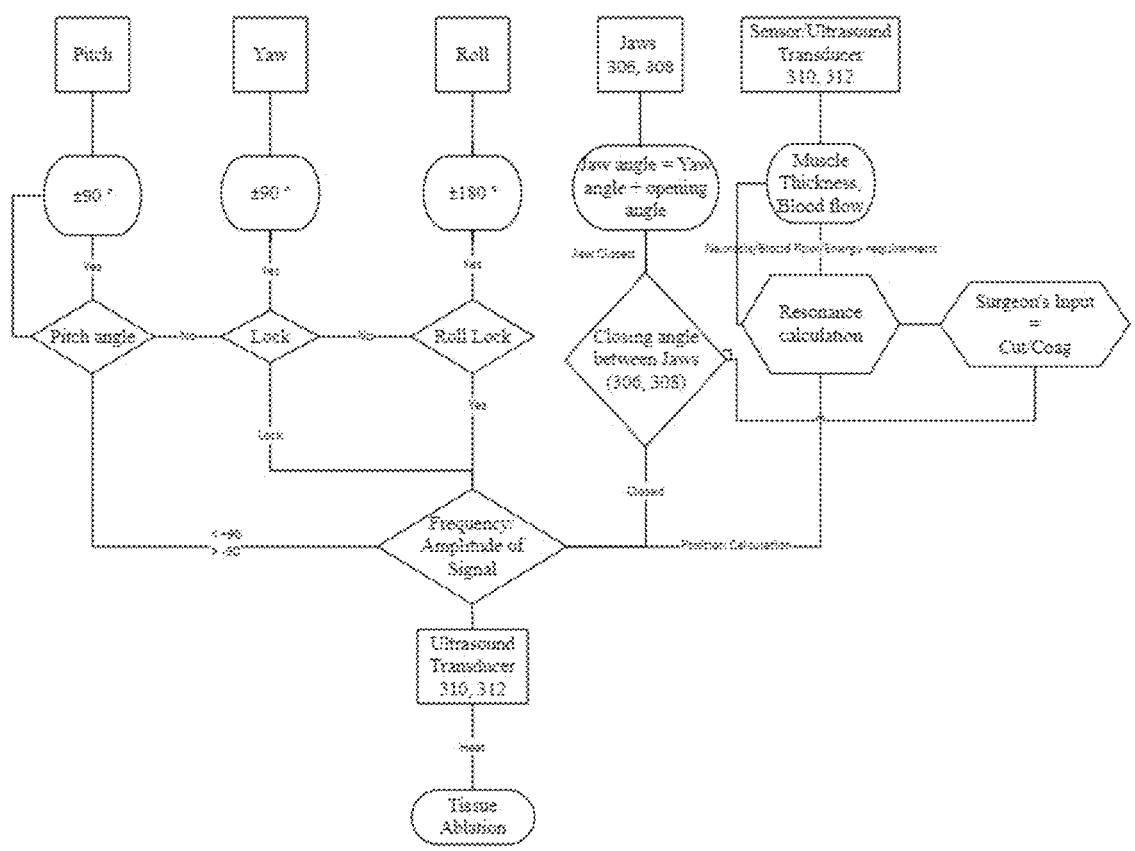
FIG. 17 illustrates a flowchart describing the procedure of tissue ablation including cutting or coagulating a blood vessel or a living tissue by an ultrasonic surgical device in accordance with an embodiment of the disclosure.

FIG. 17 illustrates a flow chart describing the procedure of tissue ablation including cutting or coagulating a blood vessel or a living tissue by the ultrasonic surgical device (300).

There are multiple types of surgical instruments available such as energy instruments which may include monopolar instruments, bipolar instruments, and harmonic instruments. These instruments come under electrosurgical instruments. The electrosurgery is the application of a high-frequency alternating polarity, and electrical current on a biological tissue to cut, coagulate, desiccate, or fulgurate tissue. Its benefits include the ability to make precise cuts with limited blood loss. Monopolar, bipolar, and harmonic are the three types of instruments used. In monopolar instruments, energy is passed from one jaw of the instrument to a grounding pad attached to the patient via the tissue. The tissue is then either cut or coagulated when energy is passed. In bipolar instruments, the energy is passed from one jaw of the instrument to the other via the tissue. The tissue is held between the two jaws, and energy is passed. Harmonic instruments make use of ultrasonic vibrations to cut a tissue faster. The harmonic instruments are essentially bipolar instruments in which ultrasonic vibrations are used in place of electrical energy through the tissue to cut it faster.

The ultrasonic surgical device of the present disclosure is advantageous, as it has a distal end with ultrasound transducers to generate the acoustic vibrations inside a target tissue of a blood vessel or living tissue. The present disclosure does not need a rod to transfer vibrations to the target tissue. Thus, dampening of acoustic vibrations will not occur. Also, as the acoustic vibrations are generated in the target tissue and thus, a desirable amount of energy can be generated in the target tissue for the process of cutting or coagulation. Further, the ultrasonic surgical devices of the present disclosure provide complete accessibility to surgeon inside the patient's body due to the feature of articulation.

Another major advantage of the present disclosure is that the cutting or coagulation of a blood vessel or living tissue does not create smoke in the patient's body. Further, the ultrasonic surgical device has ultrasound transducer array which focus the acoustic vibrations in the target site of a living tissue or blood vessel and thus, the acoustic vibrations will not spread through the instrument body.

The foregoing descriptions of exemplary embodiments of the present disclosure have been presented for purposes of illustration and description. They are not intended to be exhaustive or to limit the disclosure to the precise forms disclosed, and obviously many modifications and variations are possible in light of the above teaching. The exemplary embodiment was chosen and described in order to best explain the principles of the disclosure and its practical application, to thereby enable others skilled in the art to best utilize the disclosure and various embodiments with various modifications as are suited to the particular use contemplated. It is understood that various omissions, substitutions of equivalents are contemplated as circumstance may suggest or render expedient but is intended to cover the application or implementation without departing from the spirit or scope of the claims of the present disclosure.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While specific language has been used to describe the disclosure, any limitations arising on account of the same are not intended. As would be apparent to a person in the art, various working modifications may be made to the apparatus in order to implement the inventive concept as taught herein.

I claim:

1. An ultrasonic surgical device for a robotic surgical system, the device comprising:
    a distal end having a first jaw and a second jaw, the first jaw comprises an ultrasound transducer array, the second jaw comprises one of either a reflecting surface or an ultrasound transducer array, the distal end is configured to grasp a blood vessel or a living tissue;
    a proximal end configured to apply a drive signal to the ultrasound transducer array(s) of the distal end; and
    a plurality of rotary joints connected at the distal end, the plurality of rotary joints configured to facilitate articulation of the distal end;

wherein the ultrasound transducer array(s) of the distal end is configured to generate acoustic vibrations in the grasped blood vessel, or living tissue, based on the applied drive signal by a control system of the robotic surgical system;

wherein the ultrasound transducer array(s) of the distal end is configured to sense parameters of a target site on a grasped blood vessel or living tissue, based on the reflected acoustic vibrations from the grasped blood vessel or living tissue;

wherein based on the sensed parameters of the target site, the drive signal to the ultrasound transducer array(s) is manipulated; and wherein the generated acoustic vibrations heat the target site in the blood vessel or living tissue.

2. The ultrasonic surgical device as claimed in claim 1, wherein the first jaw and second jaw independently articulate between a first position and a second position.

3. The ultrasonic surgical device as claimed in claim 1, wherein the distal end is configured to have at least one grasping feature.

4. The ultrasonic surgical device as claimed in claim 1, wherein at least one of the first jaw or second jaw is moveable with respect to the other to constrain the blood vessel or living tissue between an open position and a closed position.

5. The ultrasonic surgical device as claimed in claim 1, wherein the ultrasound transducer array(s) comprises at least one piezoelectric crystal.

6. The ultrasonic surgical device as claimed in claim 1, wherein each transducer of the ultrasound transducer array(s) may be flat, curved in one plane, curved in multiple planes, or a combination of these.

7. The ultrasonic surgical device as claimed in claim 1, wherein the transducers in the ultrasound transducer array, are sized and shaped to substantially conform to the size of the blood vessel or living tissue to be grasped.

8. The ultrasonic surgical device as claimed in claim 1, wherein the ultrasound transducer array(s) comprises of a plurality of piezoelectric crystals connected with each other using a bonding material.

9. The ultrasonic surgical device as claimed in claim 8, wherein the bonding material can be at least one of a metal or a rubber.

10. The ultrasonic surgical device as claimed in claim 8, wherein width of the bonding material can be chosen based on the requirement.

11. The ultrasonic surgical device as claimed in claim 1, wherein the ultrasound transducer array(s) can deliver acoustic vibrations to the blood vessel or living tissue and sense an impact of the reflected acoustic vibrations on the blood vessel or living tissue.

12. The ultrasonic surgical device as claimed in claim 1, wherein the reflecting surface comprises an acoustically reflective material configured to reflect the acoustic vibrations which have reached the reflecting surface after being transmitted through the blood vessel or living tissue.

13. The ultrasonic surgical device as claimed in claim 12, wherein the acoustically reflective material can be a biocompatible metal like stainless steel or titanium etc.

14. The ultrasonic surgical device as claimed in claim 1, wherein the reflecting surface can be concave in shape.

15. The ultrasonic surgical device as claimed in claim 1, wherein the parameters of the target site may include at least one of a resonant mode of the target site, tissue thickness, vessel thickness, blood flow in a vessel, temperature of the target site, and fibrinoid necrosis of a small blood vessel, etc.

16. The ultrasonic surgical device as claimed in claim 1, wherein the manipulated drive signal applied to the ultrasound transducer array will generate acoustic vibrations at the resonant modes of the target site.

17. The ultrasonic surgical device as claimed in claim 1, wherein the reflecting surface will help in focusing the acoustic vibrations at the target site of the grasped blood vessel or living tissue.

18. The ultrasonic surgical device as claimed in claim 1, wherein the acoustic vibrations at the resonant modes will generate heat at the target site.

19. The ultrasonic surgical device as claimed in claim 1, wherein the heat in the target site can be utilised for either sealing a blood vessel or cutting a living tissue.

20. The ultrasonic surgical device as claimed in claim 1, wherein the heat in the target site can be generated based on either heat required for sealing a blood vessel or cutting a living tissue.

21. The ultrasonic surgical device as claimed in claim 1, wherein the ultrasound transducer array(s) can be made of plurality of transducers arranged in lengthwise or breadthwise manner.

22. The ultrasonic surgical device as claimed in claim 1, wherein the manipulated drive signal may be applied to all or a selected few of the ultrasound transducer array(s).

23. The ultrasonic surgical device as claimed in claim 1, wherein the acoustic vibrations are focused on the target site to achieve standing waves at the target site by desired interference between the acoustic vibrations regenerated into the tissue due to the ultrasound transducer array(s) and the reflected acoustic vibrations from the reflecting surface.

24. The ultrasonic surgical device as claimed in claim 1, wherein the reflecting surface may have a similar curvature as the ultrasound transducer array to reflect the acoustic vibrations back into the grasped blood vessel or living tissue.

25. The ultrasonic surgical device as claimed in claim 1, wherein the ultrasound transducer array(s) may include anyone of a temperature sensor, frequency sensor, PPG sensor, etc.

26. The ultrasonic surgical device as claimed in claim 1, wherein the rotary joints facilitate roll, pitch, yaw, and opening/closing of the jaws.

* * * * *